United States Patent

Kuroki

Patent Number: 5,303,936
Date of Patent: Apr. 19, 1994

[54] SEAL RING

[75] Inventor: Toshihiko Kuroki, Nihonmatsu, Japan

[73] Assignee: NOK Corporation, Tokyo, Japan

[21] Appl. No.: 104,921

[22] Filed: Jul. 29, 1993

Related U.S. Application Data

[63] Continuation of Ser. No. 946,147, Sep. 17, 1992, abandoned, which is a continuation of Ser. No. 634,915, Dec. 27, 1990, abandoned.

[30] Foreign Application Priority Data

Dec. 28, 1989 [JP] Japan .............................. 1-152368[U]
Dec. 21, 1990 [JP] Japan .............................. 2-404380[U]

[51] Int. Cl.$^5$ ............................................. F16J 15/32
[52] U.S. Cl. ................................... 277/165; 277/168; 277/220; 277/227; 277/DIG. 6
[58] Field of Search ............... 277/DIG. 6, 168, 227, 277/165, 230, 50, 220, 216, 217

[56] References Cited

U.S. PATENT DOCUMENTS

| | | | |
|---|---|---|---|
| 2,891,921 | 6/1959 | Kumnick | 277/DIG. 6 |
| 3,108,018 | 10/1963 | Lewis | 277/DIG. 6 |
| 3,873,106 | 3/1975 | Pastelak | 277/227 |
| 3,879,044 | 4/1975 | Estes | 277/DIG. 6 |
| 4,296,806 | 10/1981 | Taylor | 277/DIG. 6 |
| 4,406,469 | 9/1983 | Allison | 277/30 |
| 4,415,169 | 11/1983 | Kim | 277/125 |
| 4,432,925 | 2/1984 | Holtzberg et al. | 277/216 |
| 4,526,388 | 7/1985 | Marshall | 277/220 |
| 4,700,954 | 10/1987 | Fischer | 277/DIG. 6 |
| 4,941,669 | 7/1990 | Fujisawa et al. | 277/DIG. 6 |
| 4,986,511 | 1/1991 | Irby et al. | 277/DIG. 6 |
| 5,028,056 | 7/1991 | Bemis et al. | 277/DIG. 6 |

FOREIGN PATENT DOCUMENTS

| | | |
|---|---|---|
| 58-222813 | 12/1983 | Japan . |
| 58-222814 | 12/1983 | Japan . |
| 63-246574 | 10/1988 | Japan . |
| 2-134472 | 5/1990 | Japan . |

Primary Examiner—William A. Cuchlinski, Jr.
Assistant Examiner—Daniel G. DePumpo
Attorney, Agent, or Firm—Armstrong, Westerman, Hattori, McLeland, & Naughton

[57] ABSTRACT

A seal ring for sealing a space formed between a cylinder and a movable member inserted into the cylinder is essentially composed of a seal ring body which is fitted into a groove formed in the inner periphery of the cylinder. The seal ring body is formed of a resin material such as fluoride resin and a filler mixed with the resin material so that the seal ring body has a thermal expansion coefficient substantially equal to that of the cylinder. The filler is also mixed with the resin material so that the filler is oriented in a circumferential direction of the seal ring body. It is preferred to use a filler made of carbon fiber having an aspect ratio of about 5 to 400.

4 Claims, 2 Drawing Sheets

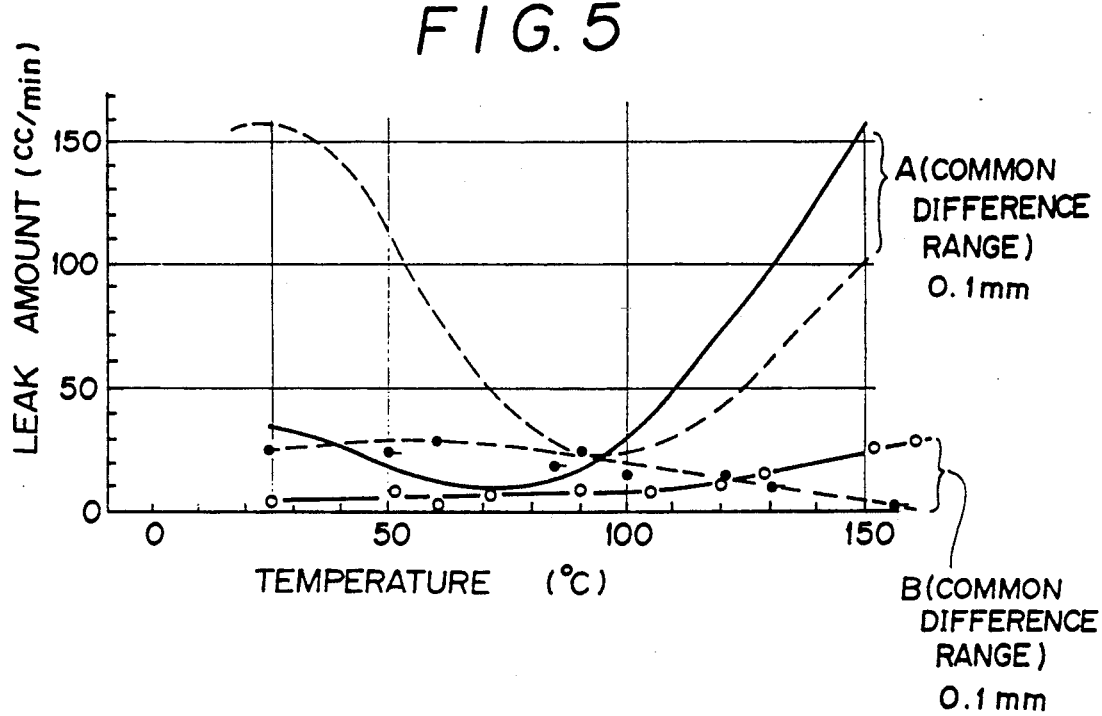

SEAL RING

This application is a continuation of 07/946,147 filed Sep. 17, 1992, now abandoned, which was a continuation of Ser. No. 07/634,915, filed Dec. 27, 1990, now abandoned.

BACKGROUND OF THE INVENTION

The present invention relates to a seal ring particularly utilized for a rotating, oscillating of reciprocating portion subjected to hydraulic control such as an automatic speed change gear or a power steering mechanism of an automobile, for example.

A seal ring particularly made of polytetrafluoro ethylene resin (to be called PTFE, hereunder) having improved low friction and wear-proof properties has been widely utilized in the prior art instead of cast iron for power steering mechanisms.

In such seal ring of the prior art, a seal ring body made of resin material is fitted into a groove formed in an inner peripheral surface of a cylinder to thereby seal a portion between the cylinder and a movable member disposed in the cylinder. The seal ring body is provided with a cut portion shaped in a straight cut, bias cut, step cut or the like. Seal rings provided with the bias cut have been widely utilized because of its stable sealing properties in a wide temperature range.

However, in the prior art described, the seal ring provided with the bias cut is apt to be influenced by its thermal expansion coefficient, resulting in the following problem.

Namely, because the seal ring body made of the resin material has a thermal expansion coefficient larger than the thermal expansion coefficient of the cylinder made of a metal material such as aluminium, even when the cut portion is adjusted to substantially reduce the amount of any leakage of oil, for example, at an ambient temperature, the size of the gap of the abutment portion of the cut ends of the seal ring body increases at a temperature higher than at the ambient temperature, resulting in the increasing of the leakage amount. On the other hand, even when the abutment portion is adjusted to substantially reduce the leakage at a high temperature, the size of the gap at the abutment portion also increases because the amount of shrinkage in the seal ring body is higher than that of the cylinder. This shrinkage results in the increasing of the leakage amount at the ambient temperature.

Furthermore, when the amount of leakage at the ambient temperature is reduced, the seal ring body has an interference fit with the cylinder at the high temperature, such that the minimum pressure, (i.e. minimum actuating pressure) of the seal ring body movable in the groove is adversely increased.

The above described problems result from the dimensional change of the gap at the abutment portion of the seal ring body due to the temperature change. In other words, the thermal expansion coefficient of the seal ring body is larger than that of the cylinder. In order to effectively reduce the dimensional change of the gap, it may be possible to reduce the range of the common difference of the outer diameter of the seal ring body (for example, to about 0.04 mm with respect to φ of 56 mm), but this working is troublesome and degraded products can often result.

SUMMARY OF THE INVENTION

An object of the present invention is to substantially eliminate defects or drawbacks encountered in the prior art described above and to provide an improved seal ring that is easily produced and capable of effectively preventing sealing defects and increasing of the minimum actuating pressure resulting from the difference between the seal ring body and the cylinder. The seal ring to which the body is applied.

This and other objects can be achieved according to the present invention by providing a seal ring for sealing a space formed between a cylinder and a movable member inserted into the cylinder. The seal ring is essentially composed of a seal ring body which is fitted into a groove formed in the inner periphery of the cylinder. The seal ring body is formed of a resin material such as fluoride resin, and filler or additives mixed with the resin material so that the seal ring body has a thermal expansion coefficient substantially equal to that of the cylinder. The filler is mixed with the resin material so that the filler is orientated in a circumferential direction of the seal ring body. It is preferred to use a filler made of carbon fiber having an asbestos ratio of about 5 to 400.

According to the characteristics described above of the seal ring of the present invention, the thermal expansion coefficients of the seal ring body and the cylinder are made substantially equal regardless of the change of the temperature, so that the abutting condition of the seal ring against the cylinder can be maintained relatively stable and constant throughout the entire temperature range.

BRIEF DESCRIPTION OF THE DRAWINGS

For a better understanding of the present invention and to show how the same is carried out, reference is made, by way of a preferred embodiment, to the accompanying drawings, in which:

FIG. 5 is a graph representing the leak amounts with respect to the temperature characteristics in accordance with the prior art and the present invention.

DESCRIPTION OF THE PREFERRED EMBODIMENT

Figure 1:
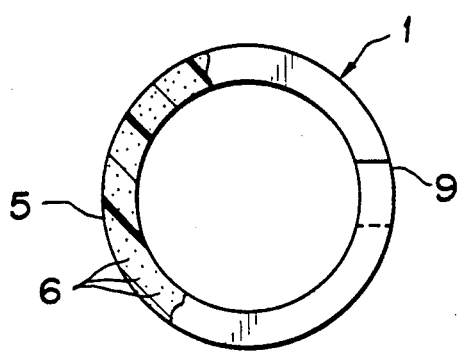
FIG. 1 is a plan view, partially in section, of a seal ring according to one embodiment of the present invention.
Figure 2:
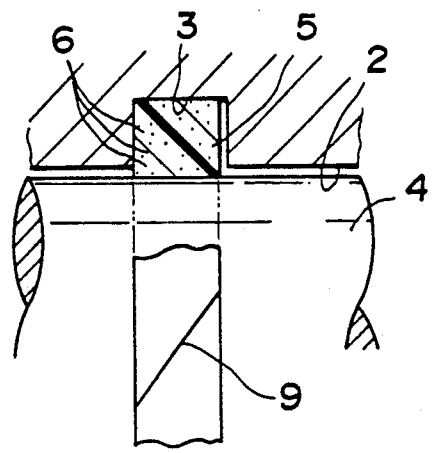
FIG. 2 is a view showing a partial section of the seal ring of FIG. 1 fitted to a cylinder.

Referring to FIGS. 1 and 2 showing one embodiment of a seal ring according to the present invention, the seal ring is essentially composed of a seal ring body 1 made of a resin material. The seal ring body 1 is fitted, in the illustration, in a groove 3 formed in the inner peripheral portion of a cylinder member 2 to thereby seal a gap between the inner peripheral surface of the cylinder 2 and an outer surface of a movable member 4. The seal ring body 1 is provided with a one cut portion 9 at which both cut ends are joined in a ring shape. The seal ring body 1 is composed of a resin material 5 such as (i.e.) fluoride resin such as PTFE or nylon) having low friction and wear-proof properties. A filler or additives 6 such as carbon is mixed with the resin material for effectively controlling the thermal expansion coefficient of the resin material 5 of the whole seal ring body 1.

In a preferred embodiment, it is desirable to mix in enough filler such that the thermal expansion coefficient of the seal ring body 1 is substantially made equal to that of the material of the cylinder 2 where the cylinder is made of metal such as aluminium. Particularly, it is desirable to dispose the filler 6 so that the orientation of the filler 6 is made parallel to the circumferential direction of the seal ring body 1. The thermal expansion coefficient of 1 to $2 \times 10^{-5}(1/°C.)$ will be selected when the cylinder 2 is made of iron, aluminium or the like material.

In the described embodiment, ethylene tetro-fluoro ethylene (ETFE) (molecular amount of $1.0 \times 10^5$ to $1.0 \times 10^6$) was used as the filler including carbon fiber (aspect ratio of 5 to 400) of 20% by weight. In particular, with the filler is disposed to be orientated circumferentially parallel, the thermal expansion coefficient ($\alpha$) of 1.5 to $2.0 \times 10^{-5}(1/°C.)$ was obtained. In the comparison with conventional seal ring having a ring body provided with the bias cut portion and made of a material with an thermal expansion coefficient ($\alpha$) of 7 to $8 \times 10^{-5}(1/°C.)$, the amount of the leakage was significantly reduced in accordance with the seal ring of the present invention.

FIG. 5 shows a graph for comparing the sealing characteristics of the seal rings of the prior art and the present invention. A symbol A represents the leak amount during use of the conventional seal ring and a symbol B represents the leak amount in use of the seal ring of the present invention. In the graph, the leak amounts are within the common difference ranges (outer diameters) of seal ring bodies of 0.1 mm. Further, the experiment was carried out by utilizing an automatic transmission fluid as an oil under pressure of 10 Kg/cm².

As understood from this graph, it is observed that the lesser leakage amount was attained in substantially the entire temperature range according to the seal ring of the present invention. Particularly, when the common difference range of the outer diameter of the seal ring body having 0.1 mm, the leakage characteristics of the conventional seal ring may largely vary, but those of the present invention vary much less. Accordingly, the common difference range can be made wide when the seal ring is made with a small thermal expansion coefficient with respect to the leakage amount of the oil.

Figure 3A:
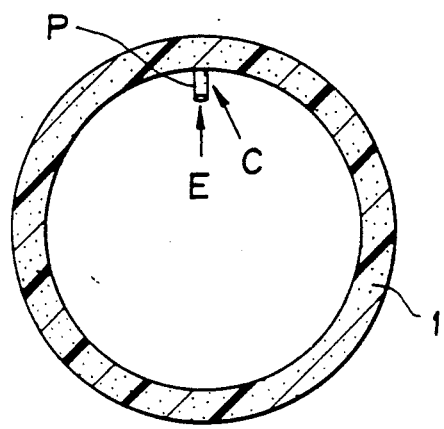
FIG. 3A is a sectional view of the seal ring in a pin-gate molding method utilizing a pin gate.
Figure 3B:
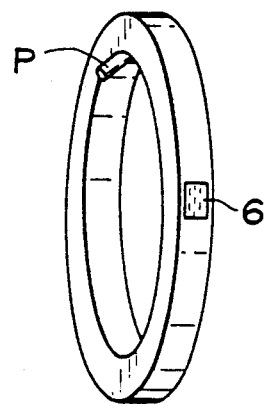
FIG. 3B is a perspective view showing a seal ring formed by the pin-gate molding method.

A method for forming the seal ring according to the present invention is preferably carried out by a pin-gate type injection molding method by disposing a pin gate P at Q circumferential portion as shown in FIG. 3A, shown in FIG. 3B, the orientation of the filler can be easily made parallel to the circumferential directions of the seal ring body. Moreover, the control of this orientation can be precisely performed by inclining the pin gate from direction E along the sealing ring body diameter to a direction C at a sharp intersecting angle with respect to the circumferential direction.

Figure 4A:
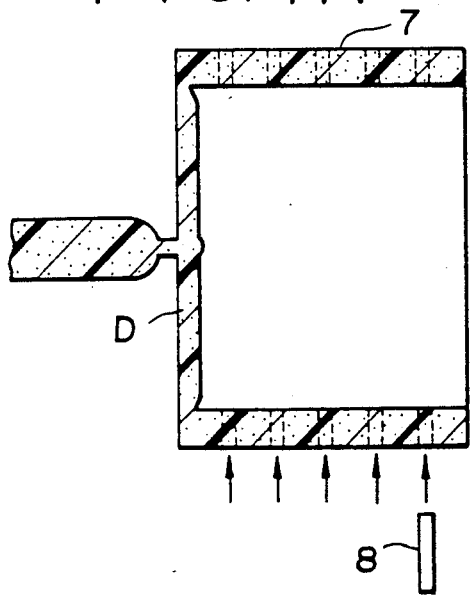
FIG. 4A is a sectional view of the seal ring in a disc-gate molding method utilizing a disc gate.
Figure 4B:
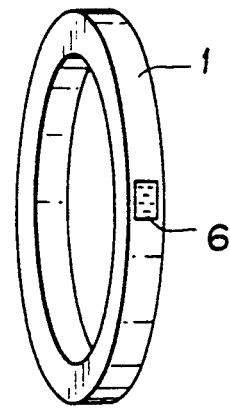
FIG. 4B is a perspective view showing a seal ring formed by the disc-gate molding method.

FIG. 4A represents a disc-gate type injection molding method utilizing a disc gate D. Comparing of this method with the pin-gate type injection molding method of FIG. 3A, in the disc-gate type method, the orientation of the filler 6 is directed normal to the circumferential direction of the seal ring body as shown in FIG. 4B. In the method of FIG. 4A, a cylindrical molded material 7 is formed by the utilization of the disc gate D. The molded material 7 is then cut into ring shapes by means of a bite 8 to form the seal ring body 1. For this reason, the flow direction of the molding material is made in the axial direction of the cylindrical molded material 7, and the filler 6 is thus oriented along this flow direction.

Accordingly, the thermal expansion coefficient of the seal ring formed in accordance with the pin-gate type method ranged between 1.5 to $2.0 \times 10^{-5}(1/°$ C.), whereas that of the disc-gate type method was 4 to $5 \times 10^{-5}(1/°C.)$. Apart from this fact, it may be said that the subject of the present invention resides in that the thermal expansion coefficient of the seal ring body 1 made of a resin material is made equal to the thermal expansion coefficient of the cylinder 2.

The seal ring body 1 as formed above is cut at one portion in the actual usage. When the seal ring body 1 is fitted into the groove 3 of the cylinder 2, the outer diameter of the seal ring body 1 at ambient temperature is made substantially equal to the inner diameter of the groove 3, whereby the area of the gap between both cut ends of the seal ring body 1 can be made constant (i.e. minimized) regardless of the temperature. This significantly reduces the amount of leakage of the oil with in the entire temperature range. In addition, there exists no interference due to the expansion of the seal ring body 1 at a high temperature between the body 1 and the inner periphery of the cylinder 2. As a result, the minimum actuating pressure can be reduced and, for example, according to the present embodiment, the minimum actuating pressure could be suppressed to a value below 0.2 kg/cm².

As described hereinbefore, according to the present invention, the thermal expansion coefficient of the seal ring body is made substantially equal, by mixing the filler into the resin material of the body, to the thermal expansion coefficient of the cylinder to which the seal ring is applied. The abutting condition of the seal ring against the cylinder can be maintained relatively and stable constant regardless of the change of the temperature, so that even when the seal ring body is provided with the cut portion, the gap between the abutting cut ends thereof can be maintained constant so as to thereby suppress and minimize the amount of leakage therethrough within the entire temperature range. In addition, in the high temperature operation, no interference develops between the seal ring body and the inner periphery of the cylinder. Effectively, the minimum actuating pressure can thus be reduced. Furthermore, when the thermal expansion amount is small with respect to the allowable leakage amount, the common difference range of the outer diameter is made wide, thus improving the quality level of the products made with the seal ring.

What is claimed is:

1. In a seal ring essentially composed of a seal ring body fitted into a groove formed in an inner periphery of a cylinder to thereby seal a space formed between the cylinder and a movable member inserted into the cylinder, the improvement in which the cylinder is made of a material selected from the group comprising aluminum and iron, the seal ring body is formed of a fluoride resin material capable of being injection molded, a filler mixed with the fluoride resin material so that the filler is oriented in an entirely circumferential direction of the seal ring body, the seal ring body has a thermal expansion coefficient smaller than that of PTFE a substantially equal to that of the cylinder, and the filler is made of carbon fiber having an aspect ratio of about 5 to 400.

2. A seal ring according to claim 1, wherein said resin material has a low friction and wear-proof property.

3. A seal ring according to claim 1, wherein said filler is mixed with said resin material by weight of about 20%.

4. A seal ring according to claim 1, wherein said seal ring body has a bias shape and is provided with a cut portion.

* * * * *